Patented May 22, 1934

1,959,433

UNITED STATES PATENT OFFICE 1,959,433

WATER-SOLUBLE RESINS OF THE PHENOL FORMALDEHYDE GROUP

Emil C. Loetscher, Dubuque, Iowa

No Drawing. Application February 11, 1931, Serial No. 515,144

8 Claims. (Cl. 260—4)

This invention relates to improvements in synthetic resins, and more particularly to resins falling generally within the phenol formaldehyde group.

The object of the invention is to provide a synthetic resin having certain new and useful properties not possessed by other so-called phenol-condensation products now in extensive commercial use, of which "Bakelite" is perhaps the best known.

A further object of the invention is to provide a synthetic resin which is especially adapted for use in the wood-working industry, and particularly in the fabrication of composite and veneered products in the form of doors, panelling, interior trim and the like.

A further object of the invention is to provide a resinous substance which is waterproof, heat-proof, comparatively acid-proof and of sufficient hardness to offer a satisfactory wear-resisting surface when applied as an exterior coating, and yet of sufficient softness to prevent the dulling of cutting edges of planes or teeth of saws, and other wood-working tools, when used either as a surface coating or an adhesive between layers or plies of wood.

A further object of the invention is to provide a synthetic resin which, in addition to the properties already enumerated, has superior adhesive and water-repelling properties, and therefore especially suitable for use in the wood-working arts as a glue.

It may be observed at the outset that certain of the qualities possessed by the resin herein disclosed are common to the numerous known phenol-condensation products, but these are relatively costly and have that degree of hardness which renders them unsuited for wood-working uses except for the finishing coatings.

In describing the resin compound generally, it may be stated that it departs from the known phenol-condensate products in that it contains a substantial proportion of a carbohydrate such as sugar or starch, instead of phenol and formaldehyde as the only essential ingredients, and it is the presence of the carbohydrate that gives it the desirable properties, aside from materially reducing its cost, since carbohydrates are relatively inexpensive and replace their equivalent in the more costly phenol and formaldehyde ingredients.

The resins produced with sugar or starch do not differ essentially in quality or properties, but the reactions are not quite parallel and hence the proportions of ingredients may vary somewhat.

Thus to make a synthetic resin using sugar as the carbohydrate content, a quantity of commercial cane sugar is dissolved in water in the proportion of 100 grams of sugar to 100 c. c. (cubic centimeters) of water, and to this solution is added an alkali such as potassium or sodium hydroxide in the proportion of 5 c. c. to 100 c. c. of the sugar solution, the alkali acting as a catalyst in the reaction that follows. The strength of the alkali solution used is relatively unimportant, although a five percent (5%) solution will be found to be quite satisfactory.

Now, equal quantities of phenol and formaldehyde (37% to 40% solution) are mixed with the sugar solution, namely, in the proportion of 100 c. c. of each to 100 c. c. of the sugar solution, that is, a mixture of equal amounts by volume of phenol, formaldehyde and the sugar solution.

The mixture is now heated in a suitable vessel until the reaction has been carried to the point at which the solution becomes a clear viscous liquid. Ordinarily this condition is reached after approximately three-quarters of an hour of heating, at a temperature of from 200° F. to 225° F.

It is important to observe that the reaction is not carried to completeness, but is stopped short thereof and at the point at which it becomes a clear liquid of a somewhat amber hue. At this point the product is water-soluble, whereas further heating to a complete reaction produces a water-insoluble substance which is not desired.

From the foregoing, it will be apparent that the production of the resin in its water-soluble state requires that the reaction not be allowed to continue beyond the point at which it passes over into its water-insoluble state. The proper point at which to stop the reaction may vary with each batch being made, and hence the following determinative method is suggested: From the boiling solution a small quantity is placed in a test-tube or beaker and cooled to room temperature, and then upon the addition of a small quantity of water a white precipitate will form. Now, if the precipitate dissolves upon reheating, the resin is still in a water-soluble state, but if the precipitate does not dissolve, it indicates that the reaction has gone too far and the resulting product will be insoluble in water, although soluble in alcohol. As a practical matter, the approximate point of stopping the reaction can readily be determined by experiment for a given set of temperature conditions by making the tests at frequent intervals as the estimated stopping point is approached, to the end that with the first indication of an insoluble precipitate, the heating is discontinued and the reaction thus stopped while the resin is still in its water-soluble state. From the standpoint of economy and convenience, the water-solubility of the resin in its initial form is important, as it greatly simplifies the task of cleaning the vessels and implements used in handling and applying the same, since they can be washed with water and do not become sticky and tacky as is the case in the handling of other insoluble phenol formaldehyde products.

The resin solution is ready for use upon the completion of the partial reaction as it can be diluted with water if a thin solution is desired. As such it may be applied directly to the surfaces of wood or fibrous materials either as a surface coating or as an adhesive between plies to be glued together, as for instance in the manufacture of composite fibrous materials or wood veneer. Again, it may be applied to paper and dried, and the paper placed between two layers or plies of wood or sheets of fibrous material.

After the application of the resin and while it is still slightly wet, the coated, laminated or veneered product, as the case may be, is placed in a press and compressed between heated platens until the resin is converted into its water-insoluble form, whereupon it becomes hard, but its hardness is such that it can be cut or sawed without difficulty.

Again, the resin solution can be evaporated to dryness and then pulverized, and when mixed with wood flour or other inert filler, provides a moulding mixture which is fairly satisfactory, and although not the equal of a pure phenol formaldehyde resin moulding mixture, is quite suitable for some purposes and considerably cheaper in cost.

A resin having practically the same characteristics and uses, may be produced by using starch instead of sugar, as already stated. For this purpose a suitable grade of casava starch is preferably employed and practically the same routine followed as before, except that the starch is mixed with water in the proportion of 150 grams to 2000 c. c. of water, and about 200 c. c. of potassium or sodium hydroxide of, say, five per cent (5%) strength, is addded to the solution. The starch has the capacity of absorbing large quantities of water, and hence the marked increase in the water added. The result of this mixture is the conversion of the solution into a mucilaginous mass, due primarily to eruption or bursting of the starch granules by the alkali metal hydroxide, and as such has much the same consistency and adhesive qualities found in the so-called vegetable glues.

More water is now added to the solution equal to the initial volume of 2000 c. c., the solution being constantly agitated as the water is added. Thus diluted, the solution is now heated in a vessel, and as it is being stirred, an added charge of the potassium or sodium hydroxide is introduced and then the phenol and formaldehyde are added to the heating mixture, in the proportion by volume of approximately 650 c. c. of each. The heating of the solution is continued at a temperature of about 200° F. for, say, 45 minutes, at the end of which time the solution takes on a consistency of a thin syrup and a clear amber color, although it can be diluted by adding more water if a thinner solution is desired. Such a resin product also provides an unusually satisfactory adhesive and one that is especially adapted for wood working, as it can be applied in a very thin layer, and when the parts are pressed together in the presence of heat, the joint becomes quite as strong as the wood itself and is waterproof to a degree that it will not deteriorate or weaken in moist or damp atmosphere.

Manifestly the exact proportions of the sugar, starch or other carbohydrate may be varied, as well as the other ingredients which enter into the resin compounds herein disclosed. Similarly other carbohydrates other than those mentioned may be used, and therefore I do not wish to be limited to exact ingredients or proportions thereof, except in so far as they are defined in the appended claims.

I claim as my invention:

1. A synthetic resin consisting of the resulting product of the reaction of a mixture of a carbohydrate water solution, phenol and formaldehyde terminated prior to reaching the state of water-insolubility.

2. A synthetic resin consisting of the resulting product of the reaction of a mixture of substantially equal parts by volume of a carbohydrate water solution, phenol and a substantially forty per cent (40%) solution of formaldehyde, carried on in the presence of heat and to a point short of conversion to a condition of water-insolubility.

3. A synthetic resin consisting of the resulting product of the initial reaction of a mixture of a water solution of cane sugar and an alkali metal hydroxide, phenol and formaldehyde carried to a point short of conversion of the product into its water-insoluble state.

4. A process for producing a water-soluble resin consisting of heating a reactive mixture of a carbohydrate solution, phenol and formaldehyde and stopping the reaction while the resulting product is still in its initial water-soluble state.

5. A process for producing a water-soluble resin consisting of heating a mixture of a carbohydrate water solution, phenol and formaldehyde at a temperature of substantially 200° F. to a point such that the resulting product remains in its water-soluble state.

6. A resin consisting of the resulting product of the reaction by heat of a solution of a carbohydrate, a phenol and formaldehyde terminated while the product is still in its water-soluble state.

7. A water-soluble resin consisting of the reaction product resulting from the boiling of a mixture composed of an alkaline solution of a carbohydrate, a phenol and formaldehyde at a temperature and for a period sufficient to carry the reaction to a point short of conversion of the product into its water-insoluble state.

8. A process for producing a water-soluble resin consisting of preparing a solution of a carbohydrate rendered alkaline by the addition of an alkali metal hydroxide, adding to said solution substantially equal parts by volume of phenol and a substantially forty per cent (40%) solution of formaldehyde, initiating the reaction by heating the mixture to a boiling temperature and continuing the reaction to a point short of that at which the product would normally be converted into its water-insoluble state.

EMIL C. LOETSCHER.